Jan. 31, 1933.  P. H. REGAN  1,895,818
DISPLAY FRAME
Filed Nov. 9, 1931   2 Sheets-Sheet 1

Inventor
Paul H. Regan
By Attorneys

Jan. 31, 1933.  P. H. REGAN  1,895,818
DISPLAY FRAME
Filed Nov. 9, 1931  2 Sheets-Sheet 2

Inventor
Paul H. Regan
By Attorneys
Southgate Hay & Hawley

Patented Jan. 31, 1933

1,895,818

UNITED STATES PATENT OFFICE

PAUL H. REGAN, OF FITCHBURG, MASSACHUSETTS

DISPLAY FRAME

Application filed November 9, 1931. Serial No. 573,848.

This invention relates to frames in which display signs may be removably mounted. Such a display frame is shown in my prior Patent No. 1,827,167 issued to me October 13, 1931.

It is the object of my present invention to provide certain important improvements in the display frames shown in my prior patent, by reason of which improvements signs may be more easily inserted and removed and will be securely held in the frame after insertion therein.

An important feature of my invention relates to the provision of a display frame in which one portion of the frame may be moved forward or rearward out of the plane of the main frame, thereby exposing the card recesses or slots of the main frame.

My invention further relates to arrangements and combinations of parts which will be hereinafter described and more particularly pointed out in the appended claims.

A preferred form of the invention is shown in the drawings, in which

Figure 1:
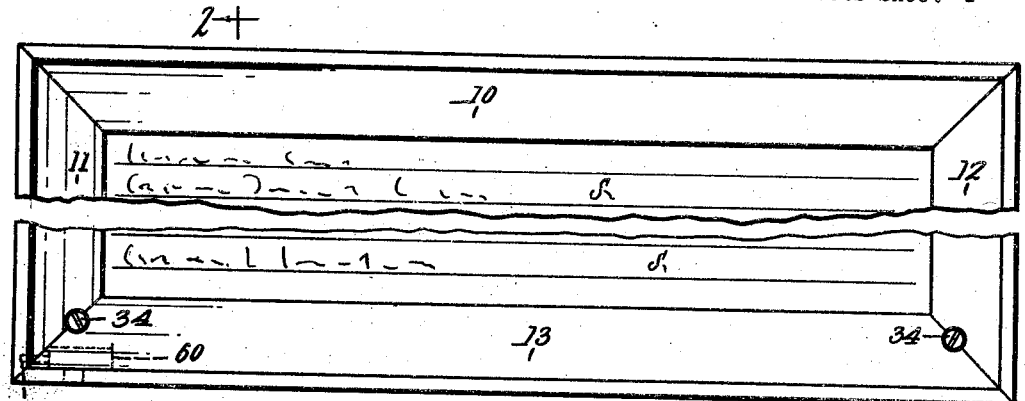
Fig. 1 is a front elevation of my improved display frame.

Referring to the drawings, I have shown my improved display frame as being of rectangular section, with a top member 10, side members 11 and 12 and a movable bottom member 13. It will be understood, however, that my invention is not limited to a rectangular frame or to any particular shape of frame but that it is applicable to any frame having a main frame portion and a frame member movably mounted relative thereto.

As shown in the drawings, the main frame members 10, 11 and 12 are mitered together at the corners and are secured to each other by angle iron braces 15 and 16. These frame members 10, 11 and 12 are provided with T-shaped card-holding recesses 17 and with grooves or saw slots 18 which are covered or bridged over by the angle braces 15 and 16 in the portions where the angle braces are positioned.

A back plate or support 20, preferably of sheet metal, is mounted in the frame members 10, 11 and 12 and is provided with ears or projections 21, 22 and 23, which extend into the saw slots 18 between and at the ends of the angle braces 15 and 16.

Guide members 30 are also secured in recesses 17 of the side frames 11 and 12. The upper ends of the guide members 30 are spaced slightly downward from the lower ends of the angle braces 15 and 16, thus providing space for the side projections 22 and 23 of the backing plate 20 and also serving to prevent downward displacement of the plate 20 after assembly in the frame.

The T-shaped recesses 17 are relatively deep and their side walls extend substantially beyond the angle braces 15 and 16 and the guide members 30, forming retaining flanges or border portions for the backing plate 20 and for the signs S and S' mounted at one or both sides of the backing plate 20.

Figure 5:
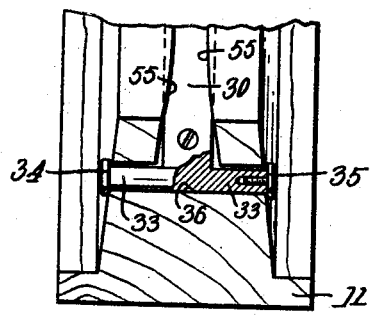
Fig. 5 is a detail side elevation, partly in section, and looking in the direction of the arrow 5 in Fig. 4.
Figure 4:
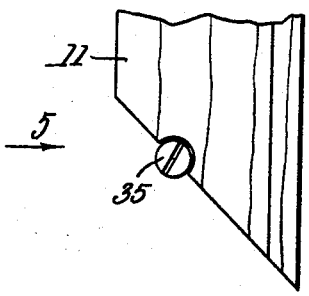
Fig. 4 is an enlarged front elevation of a portion of the main frame.
Figure 7:
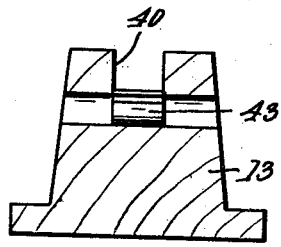
Fig. 7 is an end elevation, looking in the direction of the arrow 7 in Fig. 6.
Figure 6:
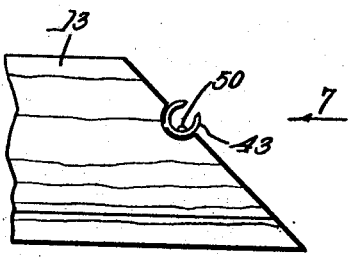
Fig. 6 is an enlarged front elevation of a portion of the movable frame member.

The guide members 30 are provided with transversely extending cylindrical head portions 33, each provided with enlarged ends 34 and 35 and also each provided with a slight cup-shaped depression 36 (Fig. 5). One or both of the enlarged ends 34 and 35 should be removable and may be made in the form of a special cap screw, as shown in Fig. 5. The bottom member 13 is mitered at its ends to fit the ends of the side frame members 11 and 12, and is provided with a relatively deep and wide groove 40 to receive the lower end of the backing plate 20 and also the lower ends of the cards or signs S or S', after the signs are inserted in position.

Figures 2, 3:
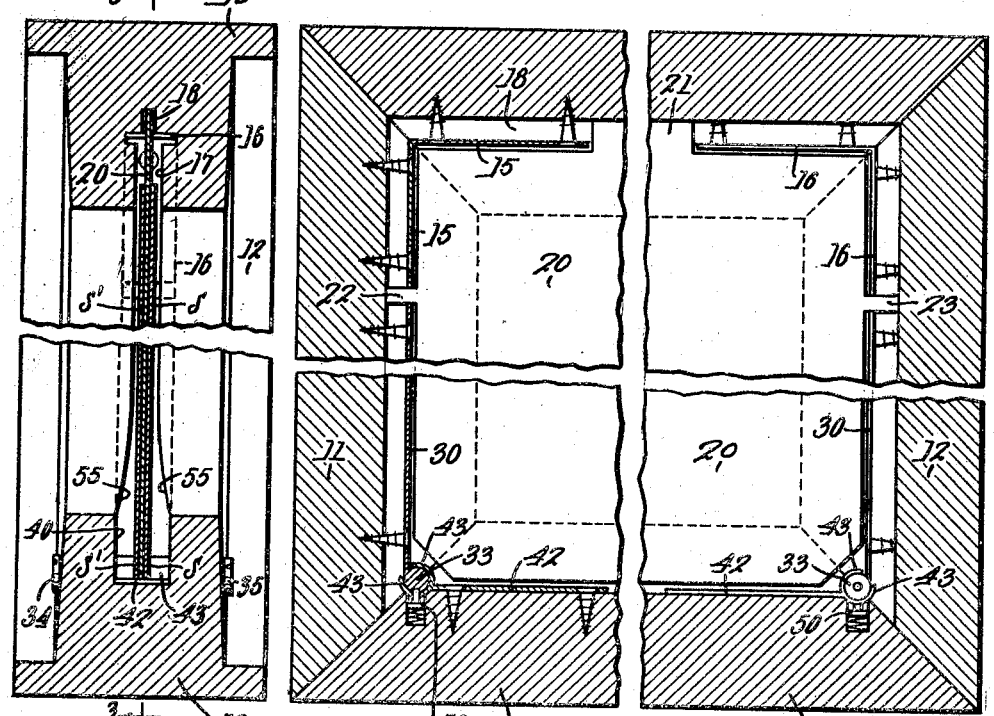
Fig. 2 is a sectional side elevation thereof, taken along the line 2—2 in Fig. 1.
Fig. 3 is a sectional front elevation, taken along the line 3—3 in Fig. 2.

Guide members 42 are secured in the bottom of the groove 40 and are each provided at one end spaced with segmental portions 43 (Fig. 3) which together form a longitudinally slotted cylindrical guideway for the cylindrical head portion 33 of the associated main frame guide member 30.

The segmental end portions 43 are preferably of a length substantially corresponding to the width of the groove 40 in the frame member 13 and are consequently only about one-third of the length of the cylindrical head portions 33. Consequently the guide members 43 and the frame member 13 supported thereby is slidable for a substantial distance along the cylindrical head portions 33, either forward or rearward relatively to the plane of the main frame.

Spring plungers 50 (Fig. 3) are mounted in recesses in the movable frame member 13 and the rounded upper ends of these plungers are normally seated in the cup-shaped recesses 36, thus holding the movable frame member yieldingly in alignment with the main frame.

Figure 8:
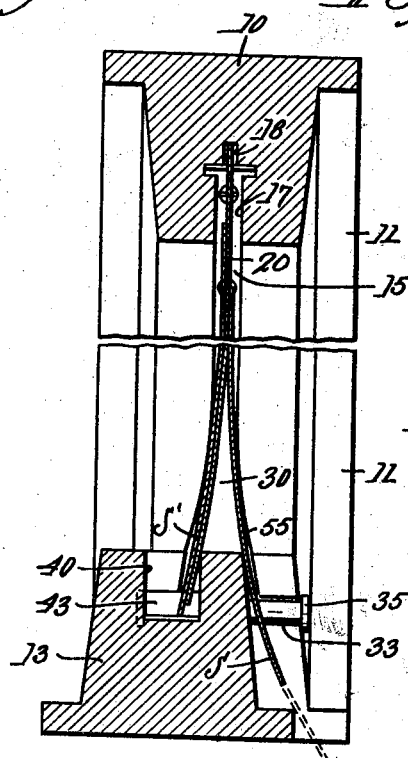
Fig. 8 is a sectional side elevation, similar to Fig. 2 but showing the parts in a different relation.

When it is desired to insert or remove a sign from the frame, the movable frame member 13 is displaced forward or rearward until the lower ends of the T-shaped grooves 17 in the side frames 11 and 12 are exposed and open downwardly, all as indicated in Fig. 8.

If it is desired to reduce the transverse travel of the frame member 13, the T-shaped grooves or sign-holding recesses 17 may be widened outwardly at their lower ends, as indicated at 55 (Fig. 8).

A sign S or S' may then be inserted, which sign is made of such height that it may be pushed upward into the T-shaped recess 17 of the top member 10 far enough to clear the top edge of the lower or movable frame member 13.

After the card is thus inserted, the frame member 13 is shifted back to normal position and alignment, whereupon the inserted card drops downward into the groove 40 in the frame member 13.

Before the frame member 13 can be thereafter shifted to permit removal of the card, the card must be pushed upward in the main frame high enough to again clear the upper edge of the frame member 13.

By removing the cap screws 35, the frame member 13 may be entirely removed from the main frame.

If it is desired to prevent unauthorized removal or insertion of signs, a lock 60 (Fig. 1) may be inserted in one of the frame members and may be provided with a bolt 61 adapted to be projected into a slot in the other frame member. A key may be conveniently inserted into the lock 60 from the under side of the frame when the frame is to be unlocked and the signs are to be changed.

I have thus provided a very convenient construction by which signs may be readily inserted or removed, which signs will be securely retained in position after being inserted therein. All parts of the device are strongly and rigidly constructed and are well adapted to their intended purposes.

Having thus described my invention and the advantages thereof, I do not wish to be limited to the details herein disclosed, otherwise than as set forth in the claims, but what I claim is:—

1. A display frame comprising a main frame and a movable frame member, said frame and member having normally aligned sign-receiving recesses in their inner faces, and means to permanently assemble and support said movable frame member on said main frame and to guide said movable frame member transversely relative to said main frame and perpendicular to the plane thereof to an assembled position therewith out of alignment with end portions of the recesses therein, whereby a sign may be removed therefrom.

2. A display frame comprising a main frame and a movable frame member, said frame and member having normally aligned sign-receiving recesses in their inner faces, said frame and movable frame member having cooperating guiding devices on which said frame member may be moved transversely out of the plane of the main frame, and spring plungers for said guiding devices by which the main frame and movable frame member are held yieldingly in normal alignment.

3. A display frame comprising a main frame having a T-shaped recess in its inner face and a relatively narrow slot at the bottom of said T-shaped recess, angle braces and guide members mounted in said recess and bridging said slot, the ends of said braces and guide members being in spaced relation, and a backing plate having lugs extending between said braces and guide members and projecting into said narrow slot, whereby said backing plate is centered laterally in said frame and also centered transversely relative to the plane of said frame.

4. The combination in a display frame as set forth in claim 1, in which means is provided for yieldingly holding said movable frame member in transverse alignment with said main frame.

5. The combination in a display frame as set forth in claim 1, in which means is provided to positively prevent relative transverse movement between said main frame and movable frame member.

6. The combination in a display frame as set forth in claim 1, in which said main frame and movable frame member have cooperating guiding devices on which said frame member may be moved transversely out of the plane of the main frame while remaining assembled therewith.

In testimony whereof I have hereunto affixed my signature.

PAUL H. REGAN.